US010616530B2

(12) United States Patent
 Choi

(10) Patent No.: US 10,616,530 B2
(45) Date of Patent: Apr. 7, 2020

(54) MULTIPOINT VIDEO CONFERENCE DEVICE AND CONTROLLING METHOD THEREOF

(71) Applicant: ELECTRONICS AND TELECOMMUNICATIONS RESEARCH INSTITUTE, Daejeon (KR)

(72) Inventor: Seung Han Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/229,774

(22) Filed: Dec. 21, 2018

(65) Prior Publication Data
US 2019/0199966 A1    Jun. 27, 2019

(30) Foreign Application Priority Data

Dec. 22, 2017  (KR) ......................... 10-2017-0178622

(51) Int. Cl.
*H04N 7/14* (2006.01)
*H04N 7/15* (2006.01)
*G06T 5/00* (2006.01)
*G06T 3/40* (2006.01)

(52) U.S. Cl.
CPC .............. *H04N 7/152* (2013.01); *G06T 3/40* (2013.01); *G06T 5/002* (2013.01); *G06T 5/003* (2013.01); *G06T 2207/10016* (2013.01)

(58) Field of Classification Search
CPC ........................................................ H04N 7/14
See application file for complete search history.

(56) References Cited

U.S. PATENT DOCUMENTS 5,684,527 A * 11/1997 Terui ..................... H04N 7/152
                                                 348/14.09
6,008,838 A * 12/1999 Iizawa .................. H04N 7/152
                                                 348/14.09
7,627,629 B1 * 12/2009 Wu ....................... H04L 12/1818
                                                 348/14.09

(Continued)

FOREIGN PATENT DOCUMENTS

KR  10-2015-0093036 A1   4/2015
KR     10-1779527 B1     9/2017

*Primary Examiner* — Olisa Anwah
(74) *Attorney, Agent, or Firm* — LRK Patent Law Firm

(57) ABSTRACT

According to the present invention, by receiving, by a transceiver, videos from each of a plurality of clients, decoding, by a first processor, the plurality of videos, mixing, by a second processor, the plurality of decoded videos into a multipoint video, encoding, by the first processor, the multipoint video, multiplexing, by the first processor, the encoded multipoint video into a plurality of multipoint videos, and transmitting, by a transceiver, each of the plurality of multipoint videos to the plurality of clients, it is possible to dramatically reduce a CPU load for video quality calibration and mixing for large capacity videos, reduce video a processing delay time, and provide a higher quality multipoint conference video to a user by performing the video quality correction function, which is performed in the CPU, by using a higher-grade GPU in video processing.

18 Claims, 4 Drawing Sheets

(56) References Cited

U.S. PATENT DOCUMENTS

| | | | |
|---|---|---|---|
| 2001/0019354 A1* | 9/2001 | Einarsson | H04N 7/152 348/14.09 |
| 2007/0285500 A1* | 12/2007 | Ma | H04N 7/152 348/14.07 |
| 2008/0136898 A1* | 6/2008 | Eisenberg | H04N 7/152 348/14.09 |
| 2010/0002069 A1* | 1/2010 | Eleftheriadis | H04N 7/152 348/14.08 |
| 2012/0260122 A1* | 10/2012 | Puri | H04L 1/0041 714/3 |
| 2014/0028788 A1* | 1/2014 | Halavy | H04N 7/147 348/14.09 |
| 2014/0043347 A1 | 2/2014 | Lee et al. | |
| 2014/0351303 A1 | 11/2014 | Park et al. | |
| 2015/0093036 A1 | 4/2015 | Park et al. | |
| 2015/0097915 A1* | 4/2015 | Navon | H04N 7/152 348/14.1 |
| 2015/0130889 A1* | 5/2015 | Jarvinen | H04N 5/265 348/14.08 |
| 2016/0173823 A1* | 6/2016 | Duckworth | H04N 7/142 348/14.07 |
| 2016/0360155 A1* | 12/2016 | Civanlar | H04N 7/152 |
| 2018/0270452 A1* | 9/2018 | Moon | H04N 7/152 |
| 2018/0302636 A1* | 10/2018 | Yu | H04N 19/30 |

\* cited by examiner

MULTIPOINT VIDEO CONFERENCE DEVICE AND CONTROLLING METHOD THEREOF

CROSS-REFERENCE TO RELATED APPLICATION

This application claims priority to and the benefit of Korean Patent Application No. 10-2017-0178622 filed in the Korean Intellectual Property Office on Dec. 22, 2017, the entire content of which is incorporated herein by reference.

BACKGROUND OF THE INVENTION

1. Field of the Invention

The present invention relates to a multipoint video conference device and a controlling method thereof.

2. Description of Related Art

In a conventional video conferencing system, a multipoint video conference device that provides an video received from a plurality of clients with high quality based on videos, receives a plurality of videos from all clients participating in the video conferencing, generates a single video by mixing the plurality of received videos, and generates a plurality of multipoint videos by mixing each of the received videos with a layout each of the clients wants, and transmits it to each of the clients.

In this video conference system, the client performs video codec encoding on a video frame and transmits the encoded video frame to the multipoint video conference device, and the multipoint video conference device decodes the video frames received from each of the clients, mixes the decoded video frames into one video frame, re-encodes the mixed video frames, and transmits the encoded video frames to all clients.

When encoding or decoding the video, it is difficult to maintain video quality of the video after encoding or decoding the same as the video quality of the original video, and when using the above video conference system, two encodings and two decodings for the same videos are performed, so that there is a problem that the quality of the video in the video conference is degraded.

Also, in a poor network environment for data communication between each client and a multipoint video conference device, each client has to transmit a video with a low bit rate, and so that the video quality of the video would be degraded. Also, in the case of a web-based video conference (WebRTC), each client (e.g., web browser) cannot adjust the bit ratio, so that the quality of the video may also be degraded.

In addition, development of video processing technology for video quality and the user's demand for video quality are increasing, so that in a case of using a multipoint video conference control device providing an ultra-high video quality (UHD: Ultra High Definition) video, there is too much information to be processed when compared with conventional HD (High-Definition or Full HD), and a method of video-mixing/video-processing performed based on software driven by the CPU, or the CPU, may invoke a problem of time delay for video processing.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a multipoint video conference device and a controlling method thereof to solve the problem of the conventional art described above by performing video processing on the decoded video by the CPU, based on a GPU (Graphics Processing Unit).

A multipoint video conference device according to an exemplary embodiment of the present invention includes: a transceiver configured to receive videos from each of a plurality of clients; a first processor configured to decode the plurality of videos; and a second processor configured to mix the plurality of decoded videos into a multipoint video, and the first processor encodes the multipoint video, multiplexes the encoded multipoint video into a plurality of multipoint videos, and transmits each of the plurality of multipoint videos to each of the plurality of clients.

The second processor reduces each of the plurality of decoded videos of a first size into a plurality of divided videos of a second size, and mixes the plurality of divided videos of the second size into the multipoint video of the first size.

The second processor applies denoising for each of the plurality of divided videos of the second size.

The second processor applies sharpening for each of the plurality of divided videos of the second size.

The first processor transmits YUV values of each of the plurality of decoded videos to the second processor, and the second processor generates the multipoint video using the YUV values of each of the plurality of decoded videos.

The second processor transmits the YUV value of the multipoint video to the first processor, and the first processor encodes the multipoint video using the YUV value of the multipoint video.

The first processor includes a plurality of first memories, and the first processor configures a first region in the plurality of first memories for transmitting the YUV values of each of the plurality of decoded videos to the second processor.

The second processor further includes a plurality of second memories, and the second processor configures a second region in the plurality of second memories for receiving the YUV values of each of the plurality of decoded videos from the first processor.

The first processor transmits the YUV values of each of the plurality of decoded videos asynchronously.

The second processor transmits the YUV value of the multipoint video to the first processor asynchronously.

A mixing speed of the second processor is faster than a mixing speed of the first processor.

A multipoint video conference controlling method according to an exemplary embodiment of the present invention includes: receiving, by a transceiver, videos from each of a plurality of clients; decoding, by a first processor, the plurality of videos; mixing, by a second processor, the plurality of decoded videos into a multipoint video; encoding, by the first processor, the multipoint video; multiplexing, by the first processor, the encoded multipoint video into a plurality of multipoint videos; and transmitting, by a transceiver, each of the plurality of multipoint videos to the plurality of clients.

The method further includes, in the reducing, by the second processor, each of the plurality of decoded videos of a first size to a plurality of divided videos of a second size, and mixing, by the second processor, the plurality of divided videos of the second size into the multipoint video of the first size.

The mixing includes applying denoising, by the second processor, for each of the plurality of divided videos of the second size.

The mixing includes applying sharpening, by the second processor, for each of the plurality of divided videos of the second size.

The mixing includes transmitting, by the first processor, YUV values of each of the plurality of decoded videos to the second processor, and mixing, by the second processor, the plurality of decoded videos into the multipoint video using the YUV values of each of the plurality of decoded videos.

The method further includes transmitting, by the second processor, the YUV value of the multipoint video to the first processor, and the encoding includes encoding, by the first processor, the multipoint video using the YUV value of the multipoint video.

The transmitting the YUV values of each of the plurality of decoded videos includes transmitting, by the first processor, the YUV values of each of the plurality of decoded videos asynchronously.

The method further includes transmitting, by the second processor, the YUV value of the multipoint video to the first processor asynchronously.

A multipoint video conference device according to an exemplary embodiment of the present invention includes: a transceiver configured to receive videos from each of a plurality of clients; a main processing unit (CPU) configured to decode the plurality of videos; and a graphics processing unit (GPU) configured to mix the plurality of decoded videos into a multipoint video, wherein the main processing unit (CPU) encodes the multipoint video, multiplexes the encoded multipoint video into a plurality of multipoint videos, and transmits each of the plurality of multipoint videos to each of the plurality of clients.

DETAILED DESCRIPTION OF THE EMBODIMENTS

Figure 1:
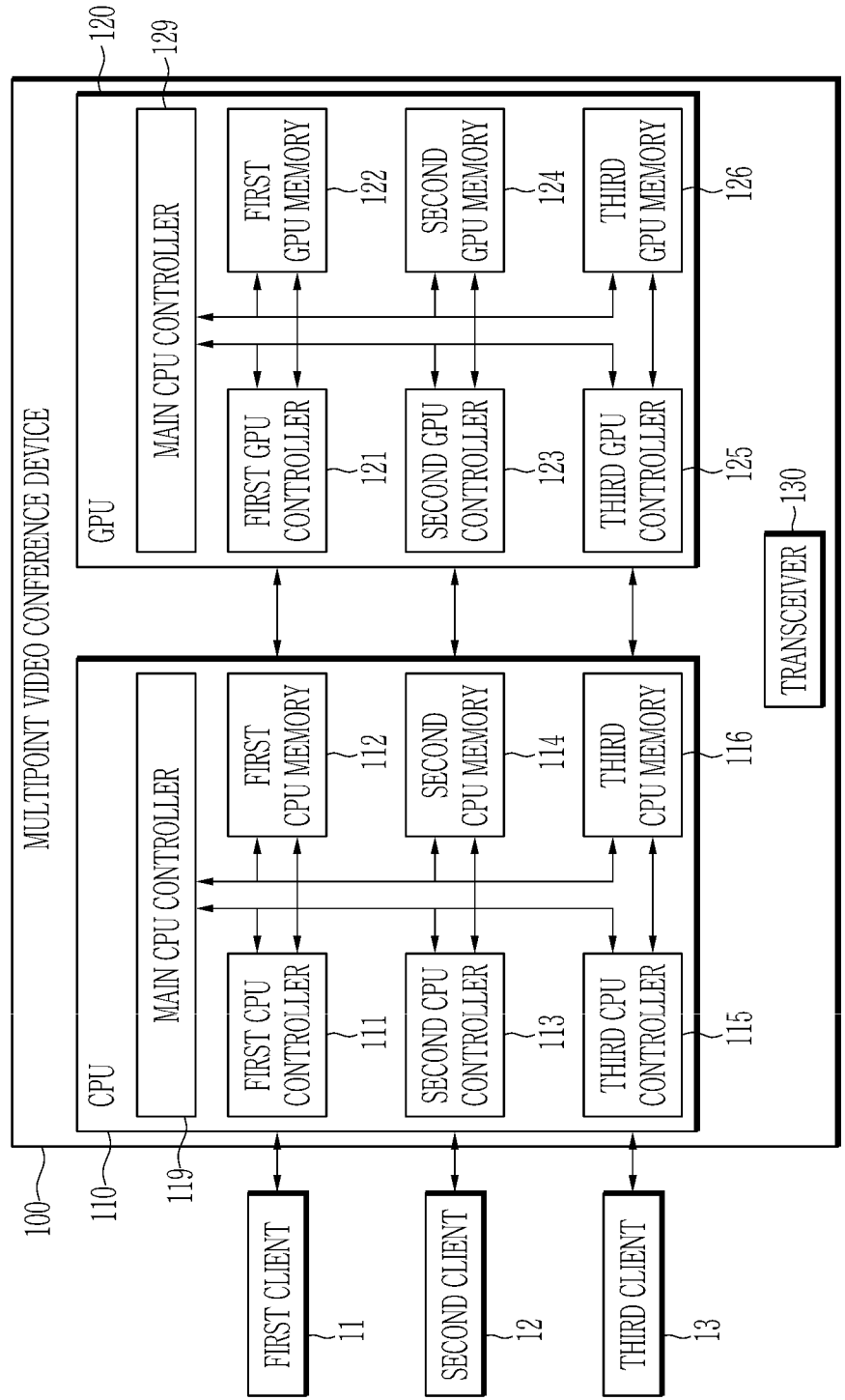
FIG. 1 shows a block diagram illustrating a configuration of a multipoint video conference device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals configure like elements throughout the specification.

Hereinafter, a multipoint video conference device and a method of controlling the same would be described, referring FIG. 1 to FIG. 4.

FIG. 1 shows a block diagram illustrating a configuration of a multipoint video conference device according to an exemplary embodiment of the present invention.

As shown in FIG. 1, according to an exemplary embodiment of the present invention, the multipoint video conferencing device 100 includes a transceiver 130 configured to receive a plurality of videos from a first client 11, a second client 12, and a third client 13, respectively, and a CPU 110 configured to transmit the plurality of videos received from the transceiver to a GPU 120 configured to mix the plurality of videos and transmit them to the CPU 110.

The CPU 110 includes a first CPU controller 111 receiving and decoding the encoded first video of the first client 11 through the transceiver 130, a second CPU controller 113 receiving and decoding the encoded second video of the second client 12 through the transceiver 130, and a third CPU controller 115 receiving and decoding the encoded third video of the client 13 through the transceiver 130. The CPU 110 further includes a first CPU memory 112 to which a first region for transmitting a YUV value of the decoded first video to the GPU 120 is configured, a second CPU memory 114 to which a second region for transmitting a YUV value of the decoded second video to the GPU 120 is configured, and a third CPU memory 116 to which a third region for transmitting a YUV value of the decoded third video to the GPU 120 is configured. The CPU 110 includes a main CPU controller 119 controlling operations of the first CPU controller 111, the second CPU controller 113, the third CPU controller 115, the first CPU memory 112, the second CPU memory 114, and the third CPU memory 116, encoding a single multipoint video mixed by the GPU 120, multiplexing the encoded single multipoint video into a plurality of multipoint videos, and transmitting the multiplexed plurality of multipoint videos to the first client 11, the second client 12, and the third client 13.

The GPU 120 includes a first GPU memory 122 for storing a YUV value of the decoded first video, a second GPU memory 124 for storing a YUV value of the decoded second video, and a third GPU memory 126 for storing a YUV value of the decoded third video. The GPU 120 may also include a main GPU controller 129 mixing the decoded first video, the decoded second video, and the decoded third video into a single multipoint video. Also, a first GPU controller 121 may perform an video quality correction function for a first video before the first video is mixed, a second GPU controller 123 may perform an video quality correction function for a second video before the second video is mixed, and a third GPU controller 125 may perform an video quality correction function for a third video before the third video is mixed.

The video quality correction function and video mixing speed of the CPU 110 may be lower than the video quality correction function and video mixing speed of the GPU 120.

Figure 2:
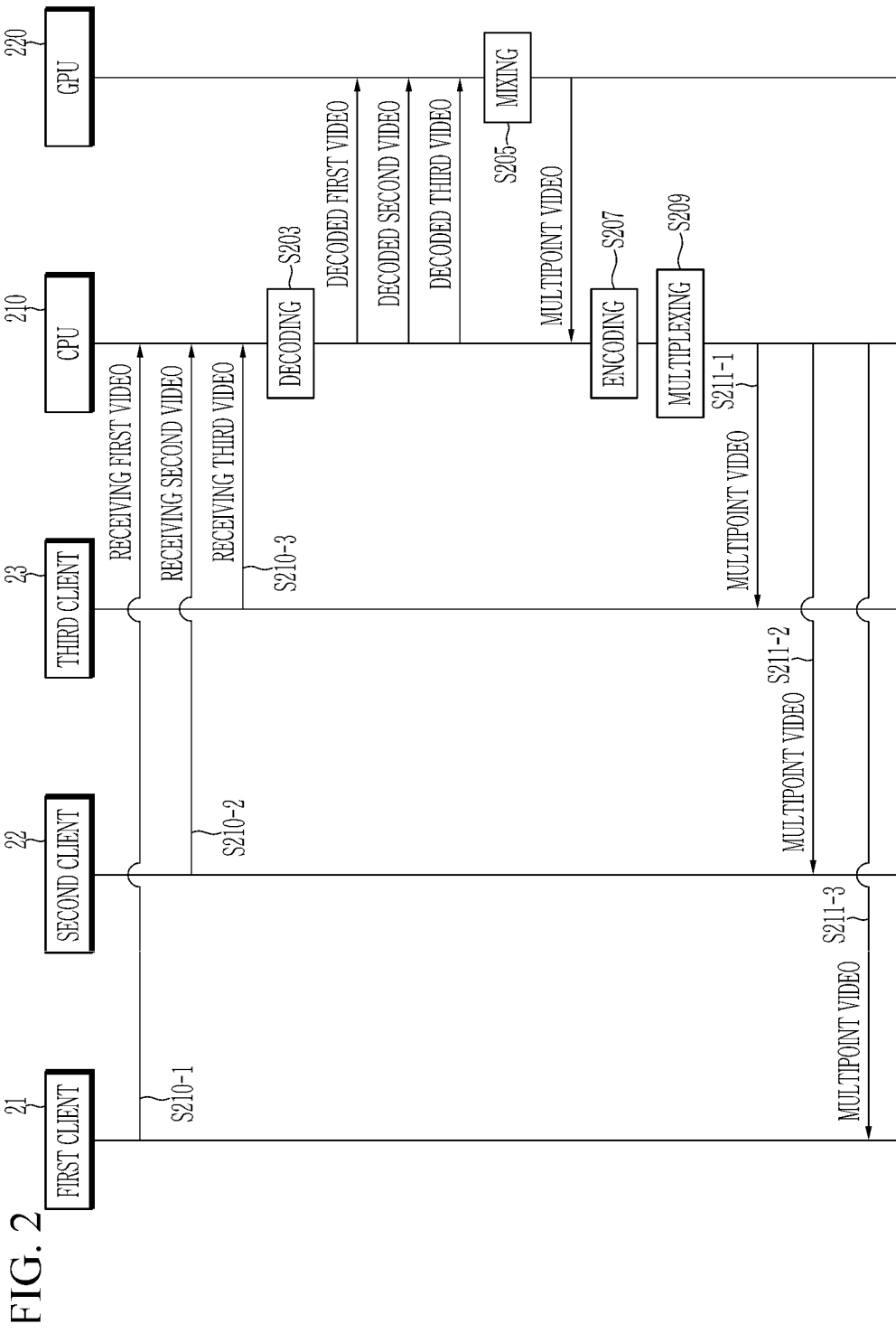
FIG. 2 shows flowchart representing a method for controlling a multipoint video conference device according to an exemplary embodiment of the present invention.

FIG. 2 shows a flowchart representing a method for controlling a multipoint video conference device according to an exemplary embodiment of the present invention.

As shown in FIG. 2, according to an exemplary embodiment of the present invention, in steps S201-1, S201-2, and S201-3, a control method of a multipoint video conference device includes receiving the first video, the second video, and the third video through the transceiver (e.g., a transceiver 130 of FIG. 1), by a CPU 210.

In step S203, the CPU 210 may decode the first video, the second video, and the third video.

In step S205, a GPU 220 receives the decoded first video, the decoded second video, and the decoded third video transmitted from the CPU 210, and mixes the decoded first video, the decoded second video, and the decoded third video into a single multipoint video.

In step S207, the CPU 210 may encode the single multipoint video transmitted from the GPU 220.

In step S209, the CPU 210 may multiplex the single encoded multipoint video into a plurality of multipoint videos.

In steps S211-1, S211-2, and S211-3, the CPU 210 may transmit each of the multiplexed plurality of multipoint videos to the first client 21, the second client 22, and the third client 23, respectively.

Figure 3:
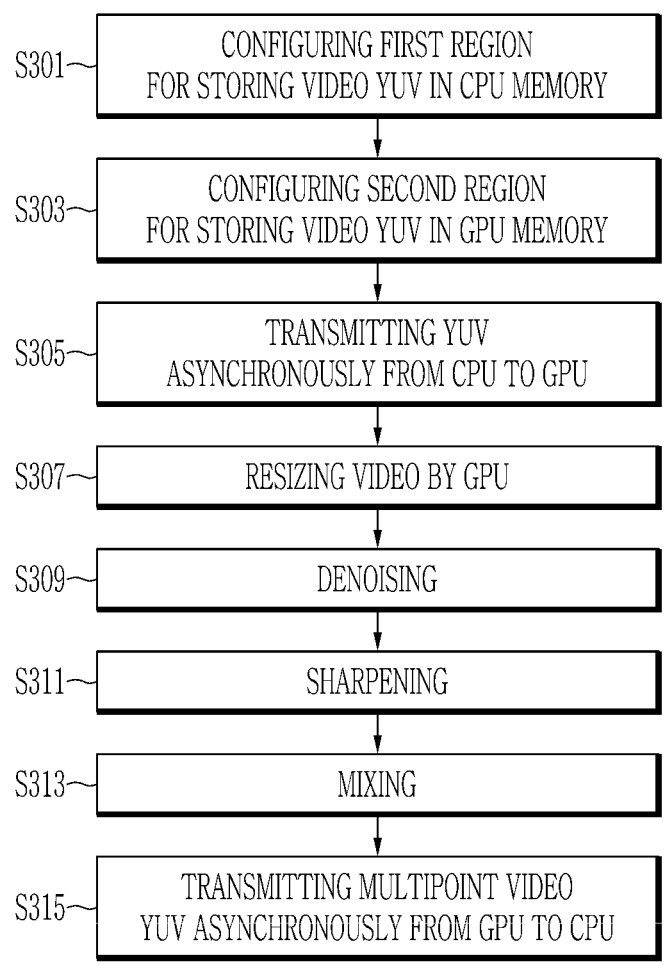
FIG. 3 shows a flowchart of operations of a CPU and a GPU of the multipoint video conference device according to an exemplary embodiment of the present invention in detail.

FIG. 3 shows a flowchart of operations of a CPU and a GPU of a multipoint video conference device according to an exemplary embodiment of the present invention in detail.

As shown in FIG. 3, according to an exemplary embodiment of the present invention, in step S301, the CPU may configure a first region for storing a YUV value of a video in a memory in the CPU. For example, the CPU can be the first CPU controller 111, the second CPU controller 113, or the third CPU controller 115 shown in FIG. 1. For example, the memory of the CPU can be the first CPU memory 112, the second CPU memory 114, or the third CPU memory 116 shown in FIG. 1.

For example, the YUV value may be expressed by a color signal (Y) and color difference signals (U, V). The U value among the color difference signals is defined as a difference between the luminance signal and the blue signal component, and the V value is defined as a difference between the luminance signal and the red signal component. Since the luminance signal component is sensitive to errors, when the video signal is encoded, more bits than in the color difference signal may be allocated to the luminance signal. A ratio of Y:U:V may be 4:2:2. When coding using YUV values, an amount of information may be ⅔ of that for coding using RGB values. For example, when converting the RGB value to the YUV value, the conversion formula for converting may be $Y=0.3R+0.59G+0.11B$, $U=(B-Y)*0.493$, $V=(R-Y)\times 0.877$. Conversely, when converting the YUV value to the RGB value, the conversion formula for converting may be $R=Y+0.956U+0.621V$, $G=Y+0.272U+0.647V$, and $B=Y+1.1061U+1.703V$.

When using the YUV value, since it is possible to separate the brightness value (luma) and a less sensitive color value (color difference), when using only the brightness value without the color value in the color space to perform video processing, it is possible to obtain a monochrome video, so that there is a merit that an even color and monochrome video can be mixed easily. In addition, when using the YUV value, it is possible to use variable data densities of brightness values and color values, so there is a merit that the video signal can be effectively reduced in size.

When the CPU configures the first region for storing YUV values in the memory, instructions using a computer program (e.g., a C programming language) can be defined as follows.

host_malloc( )

In the above, "malloc" may be a function for memory allocation.

In the above, "cuda" is an abbreviation of Compute Unified Device Architecture, and it is a GPGPU technology that enables writing parallel processing algorithms to be executed by the first GPU controller, the second GPU controller, and the third GPU controller of the GPU using the C programming language. The CUDA platform is a layer of software that allows direct access to the virtual instruction set and in parallel operation elements of the GPU for execution of a computer kernel.

In step S303, the GPU may configure the second region for storing the video YUV value in the memory of the GPU.

For example, the GPU may be the first GPU controller 121, the second GPU controller 123, or the third GPU controller 125 shown in FIG. 1, and the memory of the GPU may be the first GPU memory 122, the second GPU memory 124, or the third GPU memory 126 shown in FIG. 1.

For example, a computer programming instruction that specifies the second region for the GPU to store video YUV values in the GPU memory may be defined as follows.

```
MemoryAllocFrameYUVGPU( )
{
cudaMalloc( );
cudaStreamCreate( );
}
```

In the above, Stream Create may be a function for allocating a stream to the GPU 120. For example, an ID for stream asynchronous execution may be allocated to the GPU 120 from the CPU 110.

In step S305, the CPU 110 may transmit the YUV value of the video asynchronously to the GPU 120.

Asynchronously transmitting the YUV value of the video to the GPU 120 by the CPU 110 may cause the plurality of GPU controllers (first to third GPU controllers) of the GPU 120 to simultaneously execute the video quality correction function for each of the first to third videos.

A computer programming instruction for asynchronously transmitting the YUV value of the video from the CPU 110 to the GPU 120 may be defined as follows.

```
MemoryCopyToGPUFrameYUVGPU( )
{
cudaMemcpyAsync ( );
}
```

In step S307, the GPU 120 resizes each of the received first video, the received second video, and the received third video of a first size into second size divided videos.

For example, a computer programming instruction for resizing the first video to third video of the GPU 120 may be defined as follows.

```
gpu_YUVI420Resize( )
{
``` nppiResizeSqrPixel_8u_C1R(pFrameYUVGPUsrc->gpu_src_y, SrcSize_Y, src_y_stride, SrcRect_Y,
  pFrameYUV->gpu_mix_y, pFrameYUV->y_stride, DstRect_Y,
  xScaleFactor_Y, yScaleFactor_Y, 0.0, 0.0, eInterploationMode);
  nppiResizeSqrPixel_8u_C1R(pFrameYUVGPUsrc->gpu_src_u, SrcSize_U, src_u_stride, SrcRect_U,
  pFrameYUV->gpu_mix_u, pFrameYUV->u_stride, DstRect_U,
  xScaleFactor_Y, yScaleFactor_Y, 0.0, 0.0, eInterploationMode);
  nppiResizeSqrPixel_8u_C1R(pFrameYUVGPUsrc->gpu_src_v, SrcSize_V, src_v_stride, SrcRect_V,
  pFrameYUV->gpu_mix_v, pFrameYUV->v_stride, DstRect_V,
  xScaleFactor_Y, yScaleFactor_Y, 0.0, 0.0, eInterploationMode)

In the above, 'I420' may be an example of a YUV type, and it may be a method used to transmit the video on a network. In the above, 'Sqr' may mean a quadrangle. In the above, '8u_C1R' may mean an unsigned char 8u one channel (C1R). In the above, 'Src' may mean a YUV value before being resized by the GPU 120, and 'Dst' may mean the YUV value after being resized. In the above, 'Stride' may mean the width of the video, and 'Rect' may mean the width and the height of the video. In the above, 'ScalarFactor' may mean a resizing ratio (for example, a ratio between first size and second size).

In steps S309 and S311, the GPU 120 may perform denoising and sharpening for each video.

For example, instructions for performing denoising and sharpening for each video by the GPU 120 may be expressed as follows.

```
gpu_Denoise( )
{
    cuda_denoiseAndSharpen(FrameYUV_t *pFrameYUVGPUsrc);
}
```

In step S311, the GPU 120 mixes the videos of the denoised and sharpened videos to generate one multipoint video.

For example, a computer program instruction for mixing each video into one multipoint video by the GPU 120 may be defined as below.

```
gpu_mixing( )
{
    cuda_mixing<<<grid, threads>>>(FrameYUV_t *pFrameYUVGPUsrc,
    FrameYUV_t *pFrameYUVGPUsrc, positionx, positiony);
}
```

In the above, 'grid' means 'GPU 120' in FIG. 1, and 'thread' may refer to a plurality of GPU controllers 121, 123, and 125 in FIG. 1.

In step S313, the GPU 120 may asynchronously transmit the YUV value of the multipoint video to the CPU 110.

For example, computer programming instructions for transmitting the YUV values of multipoint videos from the GPU 120 to the CPU 110 may be defined as described below.

```
MemoryCopyToHostFrameYUV( )
{
    cuda_mixing<<<grid, threads>>>(FrameYUV_t *pFrameYUVGPUsrc,
    FrameYUV_t *pFrameYUVGPUsrc, positionx, positiony);
}
```

Figure 4:
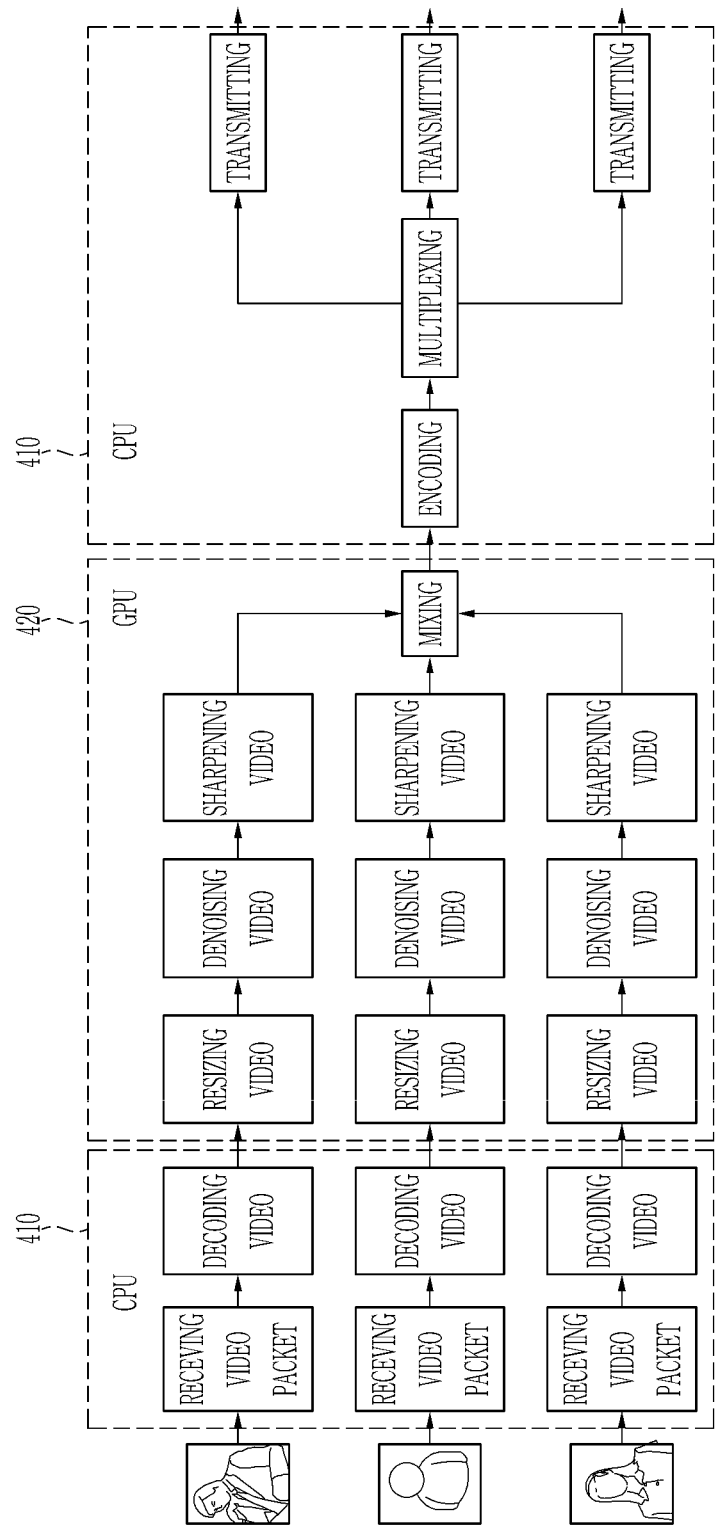
FIG. 4 shows a flowchart of operations of the CPU and the GPU of the multipoint video conference device according to an exemplary embodiment of the present invention in order.

FIG. 4 shows a flowchart of operations of a CPU and a GPU of a multipoint video conference device according to an exemplary embodiment of the present invention in order.

As shown in FIG. 4, according to an exemplary embodiment of the present invention, a CPU 410 may receive a plurality of video packets. The CPU 410 may perform decoding on each of the plurality of received video packets.

When decoding is performed for each of the videos by the CPU 410, a GPU 420 receives the decoded plurality of videos. The GPU 420 may resize each of the plurality of received videos of a first size into a plurality of divided videos of a second size. The GPU 420 may perform denoising for each of the resized plurality of divided videos of the second size. The GPU 420 may perform sharpening on each of the divided videos while performing denoising. The GPU 420 may mix the plurality of divided videos having undergone resizing, denoising, and sharpening to a single multipoint video of the first size.

When the video quality of the plurality of decoded videos are corrected and mixed into the multipoint video, the CPU 410 receives the multipoint video. The CPU 410 may encode the received multipoint video. The CPU 410 may multiplex the encoded multipoint video into a plurality of multipoint videos in order to transmit them to the plurality of clients. The CPU 410 may transmit the plurality of multipoint videos to each of the clients through a transceiver (e.g., the transceiver 130 of FIG. 1).

According to the exemplary embodiment of the present invention, by performing the video quality correction function using the GPU instead of the CPU, and by performing mixing for the video using the GPU, loads for the CPU for video quality correction and mixing for large capacity videos can be drastically reduced, so that the delay time for video processing delay may be reduced.

According to another aspect, by performing the video quality correction function, which was performed in the CPU of the conventional art, by using a higher-grade GPU in the video processing, a higher-quality multipoint conference video may be provided to the user.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A multipoint video conference device comprising:
   a transceiver configured to receive videos from each of a plurality of clients;
   a first processor configured to decode the plurality of videos; and
   a second processor configured to mix the plurality of decoded videos into a multipoint video,
   wherein the first processor encodes the multipoint video, multiplexes the encoded multipoint video into a plurality of multipoint videos, and transmits each of the plurality of multipoint videos to each of the plurality of clients, and
   wherein the second processor reduces each of the plurality of decoded videos of a first size into a plurality of divided videos of a second size, and mixes the plurality of divided videos of the second size into the multipoint video of the first size.

2. The device of claim 1, wherein the second processor applies denoising for each of the plurality of divided videos of the second size.

3. The device of claim 1, wherein the second processor applies sharpening for each of the plurality of divided videos of the second size.

4. The device of claim 1, wherein:
   the first processor transmits YUV values of each of the plurality of decoded videos to the second processor, and
   the second processor generates the multipoint video using the YLTV values of each of the plurality of decoded videos.

5. The device of claim 4, wherein:
   the second processor transmits YUV value of the multipoint video to the first processor, and
   the first processor encodes the multipoint video using the YUV value of the multipoint video.

6. The device, of claim 4, wherein:
   the first processor includes a plurality of first memories, and the first processor configures a first region in the plurality of first memories for transmitting the YUV values of each of the plurality of decoded videos to the second processor.

7. The device, of claim 5, wherein:
the second processor further includes a plurality of second memories, and
the second processor configures a second region in the plurality of second memories for receiving the YUV values of each of the plurality of decoded videos from the first processor.

8. The device of claim 4, wherein the first processor transmits the YUV values of each of the plurality of decoded videos asynchronously.

9. The device of claim 8, wherein the second processor transmits the YUV value of the multipoint video to the first processor asynchronously.

10. The device of claim 1, wherein a mixing speed of the second processor is faster than a mixing speed of the first processor.

11. A multipoint video conference controlling method comprising:
receiving, by a transceiver, videos from each of a plurality of clients;
decoding, by a first processor, the plurality of videos;
mixing, by a second processor, the plurality of decoded videos into a multipoint video;
encoding, by the first processor, the multipoint video;
multiplexing, by the first processor, the encoded multipoint video into a plurality of multipoint videos; and
transmitting, by a transceiver, each of the plurality of multipoint videos to the plurality of clients,
wherein the mixing includes:
reducing, by the second processor, each of the plurality of decoded videos of a first size to a plurality of divided videos of a second size, and
mixing, by the second processor, the plurality of divided videos of the second size into the multipoint video of the first size.

12. The method of claim 11, wherein the mixing includes applying denoising, by the second processor, for each of the plurality of divided videos of the second size.

13. The method of claim 11, wherein the mixing includes applying sharpening, by the second processor, for each of the plurality of divided videos of the second size.

14. The method of claim 11, wherein the mixing includes:
transmitting, by the first processor, YUV values of each of the plurality of decoded videos to the second processor, and
mixing, by the second processor, the plurality of decoded videos into the multipoint video using the YUV values of each of the plurality of decoded videos.

15. The method of claim 14, further comprising:
transmitting, by the second processor, the YUV value of the multipoint video to the first processor, and
the encoding includes encoding, by the first processor, the multipoint video using the YUV value of the multipoint video.

16. The method of claim 14, wherein the transmitting of the YUV values of each of the plurality of decoded videos includes:
transmitting, by the first processor, the YUV values of each of the plurality of decoded videos asynchronously.

17. The method of claim 16, further comprising:
transmitting, by the second processor, the YUV value of the multipoint video to the first processor asynchronously.

18. A multipoint video conference device comprising:
a transceiver configured to receive videos from each of a plurality of clients;
a main processing unit (CPU) configured to decode the plurality of videos; and
a graphics processing unit (GPU) configured to mix the plurality of decoded videos into a multipoint video,
wherein the main processing unit (CPU) encodes the multipoint video, multiplexes the encoded multipoint video into a plurality of multipoint videos, and transmits each of the plurality of multipoint videos to each of the plurality of clients, and
wherein the graphics processing unit (GPU) reduces each of the plurality of decoded videos of a first size into a plurality of divided videos of a second size, and mixes the plurality of divided videos of the second size into the multipoint video of the first size.

* * * * *